United States Patent
Freeman et al.

(10) Patent No.: US 11,131,215 B2
(45) Date of Patent: Sep. 28, 2021

(54) TURBINE SHROUD CARTRIDGE ASSEMBLY WITH SEALING FEATURES

(71) Applicants: Rolls-Royce North American Technologies Inc., Indianapolis, IN (US); Rolls-Royce Corporation, Indianapolis, IN (US)

(72) Inventors: Ted J. Freeman, Danville, IN (US); David J. Thomas, Brownsburg, IN (US); Jeffrey A. Walston, Indianapolis, IN (US); Aaron D. Sippel, Zionsville, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/688,555

(22) Filed: Nov. 19, 2019

(65) Prior Publication Data
US 2021/0148252 A1    May 20, 2021

(51) Int. Cl.
*F01D 11/08*     (2006.01)
*F01D 25/24*     (2006.01)
*F01D 9/04*      (2006.01)

(52) U.S. Cl.
CPC .............. *F01D 25/246* (2013.01); *F01D 9/04* (2013.01); *F05D 2240/11* (2013.01); *F05D 2260/31* (2013.01); *F05D 2260/38* (2013.01); *F05D 2300/6033* (2013.01)

(58) Field of Classification Search
CPC ...... F01D 11/003; F01D 11/005; F01D 11/08; F01D 11/12; F01D 11/18; F01D 25/246; F01D 9/04; F05D 2240/11; F05D 2260/31; F05D 2260/38; F05D 2300/6308; F16J 15/0887
See application file for complete search history.

(56) References Cited

U.S. PATENT DOCUMENTS

| | | | |
|---|---|---|---|
| 5,738,490 A * | 4/1998 | Pizzi | F01D 11/08 415/139 |
| 7,011,493 B2 * | 3/2006 | Marchi | F01D 9/04 415/116 |
| 8,944,756 B2 | 2/2015 | Lagueux | |
| 9,822,668 B2 * | 11/2017 | Duguay | F01D 25/246 |
| 9,850,775 B2 | 12/2017 | Pietrobon et al. | |
| 10,001,022 B2 | 6/2018 | Stock et al. | |
| 10,087,771 B2 | 10/2018 | McGarrah | |
| 10,100,660 B2 * | 10/2018 | Sippel | F01D 11/08 |
| 10,132,184 B2 | 11/2018 | McCaffrey et al. | |
| 10,138,750 B2 | 11/2018 | McCaffrey et al. | |
| 10,161,258 B2 | 12/2018 | McCaffrey et al. | |
| 10,221,715 B2 | 3/2019 | Varney et al. | |
| 10,233,844 B2 | 3/2019 | Bogard et al. | |

(Continued)

*Primary Examiner* — Woody A Lee, Jr.
*Assistant Examiner* — Maxime M Adjagbe
(74) *Attorney, Agent, or Firm* — Barnes & Thornburg LLP

(57) ABSTRACT

A turbine shroud assembly for use with a gas turbine engine includes a blade track segment coupled to a carrier segment, and a sheet-metal seal that seals therebetween. The blade track segment includes a shroud wall that extends circumferentially partway around an axis and an attachment feature that extends radially outward from the shroud wall. The carrier is coupled with the attachment feature to support the blade track segment.

19 Claims, 4 Drawing Sheets

(56) References Cited

U.S. PATENT DOCUMENTS

| | | |
|---|---|---|
| 2016/0177786 A1 | 6/2016 | Sippel et al. |
| 2017/0009594 A1* | 1/2017 | Snyder ................ F01D 11/005 |
| 2017/0089211 A1 | 3/2017 | Broomer et al. |

* cited by examiner

TURBINE SHROUD CARTRIDGE ASSEMBLY WITH SEALING FEATURES

FIELD OF THE DISCLOSURE

The present disclosure relates generally to gas turbine engines, and more specifically to sealing features for turbine shrouds adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional arrangements may not allow for the differing levels of expansion and contraction during operation of the gas turbine engine.

SUMMARY

The present disclosure may comprise one or more of the following features and combinations thereof.

According to an aspect of the present disclosure, a turbine shroud assembly for use with a gas turbine engine may include a carrier, a blade track, and a first seal. The carrier can be made of metallic materials and arranged circumferentially at least partway around an axis. The carrier may have an inner radial surface that faces the axis and an outer radial surface that is opposite the inner radial surface. The blade track segment may be made of ceramic matrix composite materials. The blade track segment may be supported by the carrier to locate the blade track segment radially outward of the axis. The blade track segment may include a shroud wall that extends circumferentially partway around the axis to define a portion of a gas path of the turbine shroud assembly. The blade track segment may include an attachment feature that extends radially outward from the shroud wall and may be coupled with the carrier.

The first seal may be made of sheet metal materials and arranged circumferentially at least partway around the axis. The first seal may engage with the inner radial surface of the carrier and with the blade track segment to block gases from flowing between the carrier and the blade track segment. In this arrangement the first seal may be compressed and/or elastically deformed by the carrier and the blade track segment to bias the first seal into engagement with the blade track segment. In some embodiments, a portion of the first seal may be biased into engagement with the attachment feature of the blade track segment.

In some embodiments, the first seal may be formed to define a radially inwardly opening channel. The attachment feature of the blade track segment may be located in the radially inwardly opening channel of the first seal. Portions of the first seal may be biased into engagement with fore and aft surfaces of the attachment feature.

In other embodiments, the carrier may include an outer wall, a first flange, and a second flange. The first flange and the second flange may extend radially inward from the outer wall. The outer wall, the first flange, and the second flange may define a radially inwardly opening cavity that receives the attachment feature and the first seal. Portions of the first seal can be biased into engagement with the first flange and the second flange.

In some embodiments, the first seal may include a first terminal end, a second terminal end, and a mid-portion. The first terminal end may engage with the carrier. The second terminal end may engage with the shroud wall of the blade track segment. The mid-portion may be located between the first and second terminal ends and may engage with the attachment feature of the blade track segment.

In some embodiments, the carrier and/or the blade track segment may include a radially facing surface and an axially facing surface. The first terminal end and/or the second terminal end may engage with the axially facing surface to block axial movement of the first seal relative to either the carrier or the blade track segment.

In other embodiments, a portion of the first seal may be formed to define corrugations. The corrugations may allow gases to flow between the blade track segment and the first seal in the channels created by the corrugations.

In some embodiments, an additional second seal may be made of sheet metal materials and arranged about the axis circumferentially. The second seal may have a substantially similar shape to that of the first seal. The second seal may be nested with the first seal.

In other embodiments, the first seal may be formed to define a first plurality of slots that extend radially partway through the first seal. The second seal may be formed to define a second plurality of slots that extend radially partway through the second seal. The second plurality of slots can be misaligned circumferentially with the first plurality of slots.

According to another aspect of the present disclosure, a turbine shroud assembly for use with a gas turbine engine may include a carrier, a blade track segment, and a seal. The carrier may be arranged circumferentially at least partway around an axis. The blade track segment may include a shroud wall that extends circumferentially partway around the axis and an attachment feature that extends radially outward from the shroud wall. The attachment feature may couple the blade track segment with the carrier such that the blade track segment is supported radially by the carrier.

The seal may be made of sheet metal material and extend circumferentially about the axis. The seal may be elastically deformed between the carrier and the blade track segment to urge the seal into engagement with the blade track segment. In some embodiments, the seal may be curved to define a channel. In further embodiments, the attachment feature of the blade track segment may be located in the channel.

In some embodiments, the seal may be fixed to the carrier. In some embodiments, the seal may engage with the attachment feature.

In some embodiments, the seal may be formed to define corrugations. The corrugation may allow gases to flow between the blade track segment and the seal through the channels created by the corrugations.

In some embodiments, an additional second seal may be made of sheet metal materials. The second seal may be nested with the first seal.

In some embodiments, the seal may be formed to define a first plurality of slots that extend radially partway through the seal. The second seal may be formed to define a second plurality of slots that extend radially partway through the second seal. The second plurality of slots may be misaligned circumferentially with the first plurality of slots.

In some embodiments, the carrier and/or the blade track segment may include a radially facing surface and an axially facing surface. The axial facing surface may block axial movement of the first seal relative to the carrier and/or blade track segment.

In some embodiments, a fastener may extend through the carrier and into the attachment feature. The fastener may couple the attachment feature of the blade track segment with the carrier.

In some embodiments the seal may extend circumferentially partway around the axis the same circumferential length as the carrier and/or blade track segment.

These and other features of the present disclosure will become more apparent from the following description of the illustrative embodiments.

DETAILED DESCRIPTION OF THE DRAWINGS

Figure 1:
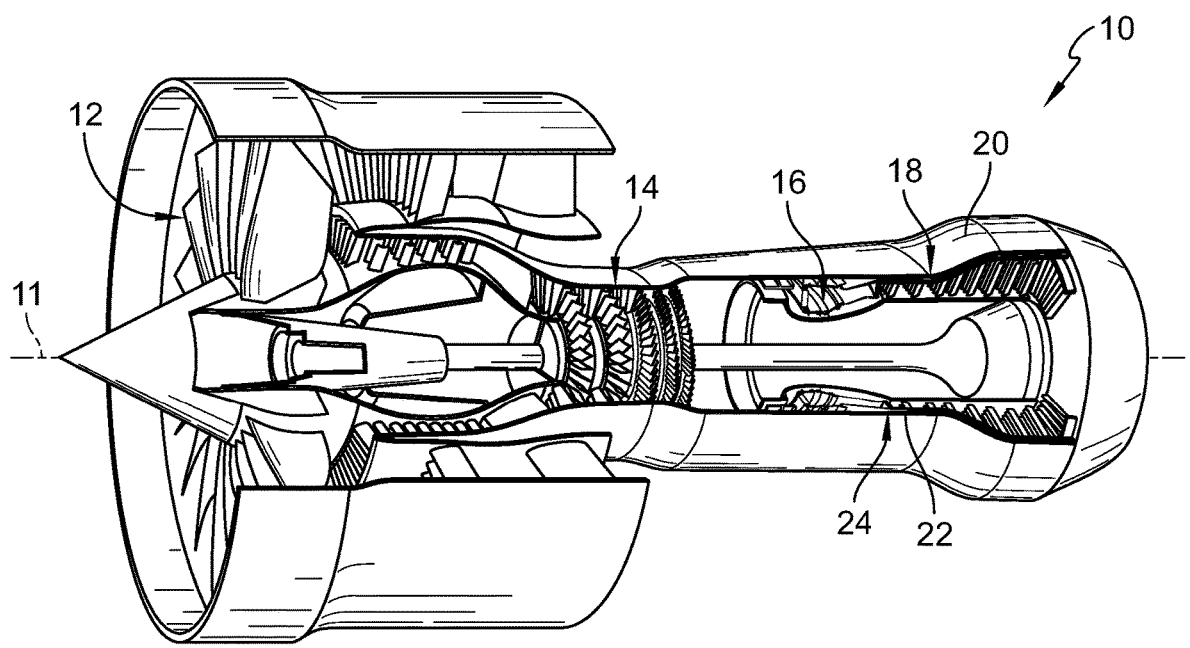
FIG. 1 is a cutaway perspective view of a gas turbine engine that includes a fan, a compressor, a combustor, and a turbine, the turbine includes a turbine shroud assembly that extended circumferentially around the axis and circumferentially around a turbine wheel that is driven to rotate about an axis of the engine to generate power.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration.

Figure 2:
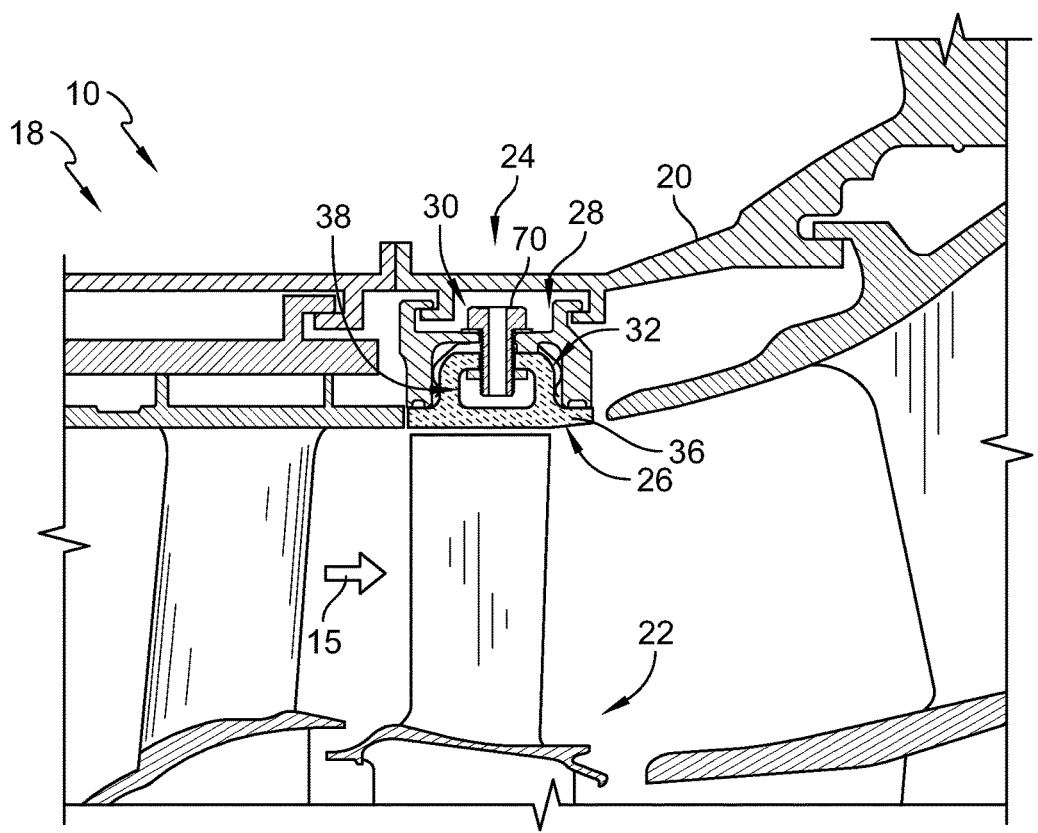
FIG. 2 is a cross-sectional view of a portion of the turbine included in the gas turbine engine of FIG. 1 showing one of the turbine wheel assemblies and the turbine shroud arranged around the turbine wheel assembly, the turbine shroud including a blade track segment, a carrier segment, and a sheet metal seal located between and sealing against the blade track segment and the carrier segment and configured to block gases from entering a cavity between the blade track segment and carrier segment.

The turbine 18 includes a turbine outer case 20, at least one turbine wheel assembly 22 and a turbine shroud assembly 24 positioned to surround the turbine wheel assembly 22 as shown in FIGS. 1 and 2. The turbine shroud assembly 24 extends circumferentially about the engine axis 11 and defines a gas path 15 outer boundary through which hot, high-pressure combustion products can flow. The turbine shroud assembly 24 includes a blade track segment 26 that forms the boundary with the gas path 15, a carrier segment 28 that couples the turbine shroud assembly 24 to the turbine case 20, and a sheet-metal seal 32 that blocks gases from flowing between the carrier segment 28 and the blade track segment 26 as shown in FIG. 2. The turbine shroud assembly 24 cooperates with the turbine wheel assembly 22 to prevent combustion products from passing over the top of the turbine wheel assembly 22. Thereby, the combustion products force the turbine wheel assembly 22 to rotate and drive the compressor 14 and the fan 12.

Figure 3:
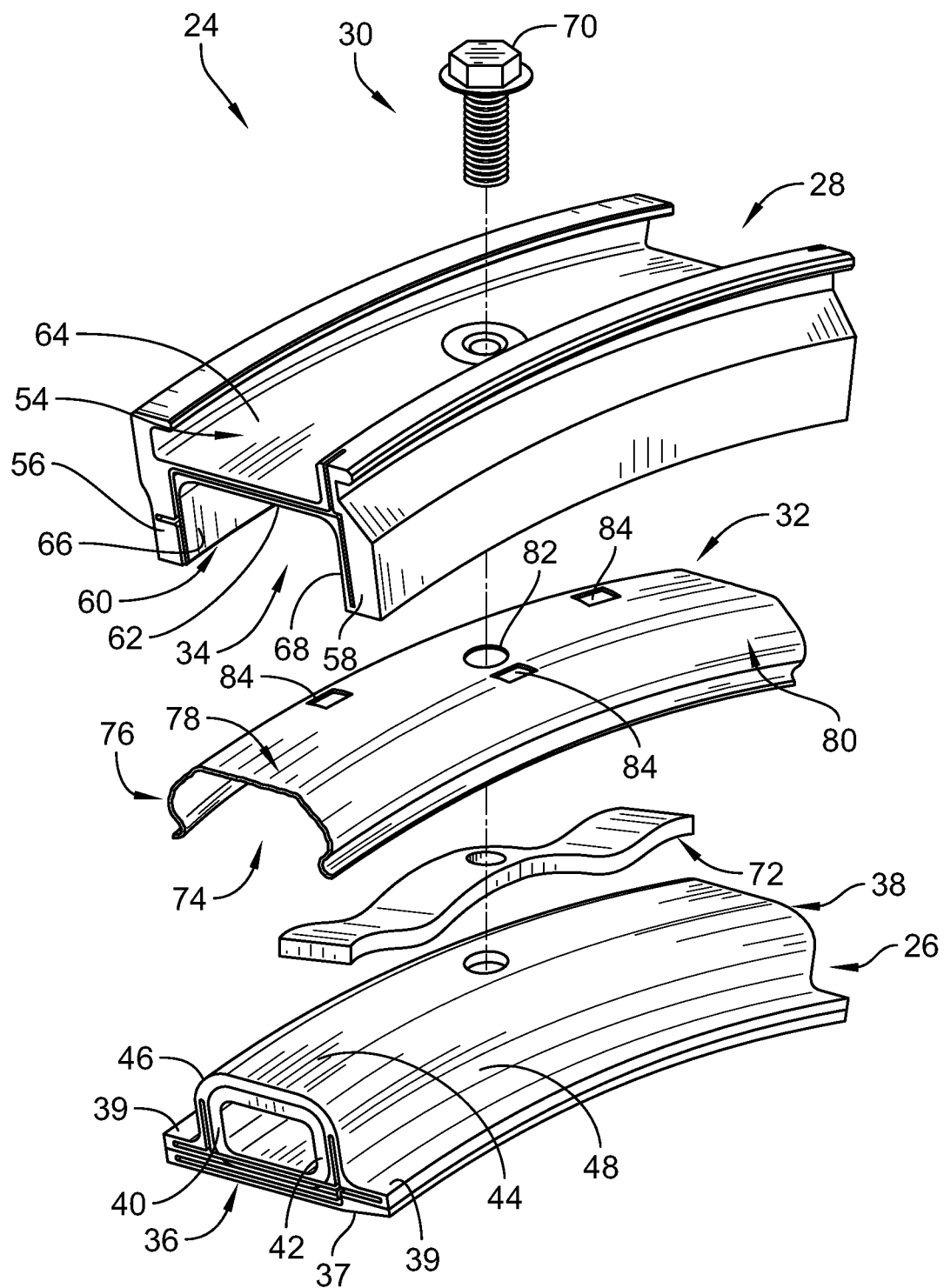
FIG. 3 is an exploded perspective assembly view of the turbine shroud of FIG. 2 showing the sheet metal seal has a U-shape configuration and locates in an inwardly opening cavity of the carrier segment and assembles over a box-section attachment feature of the blade track segment, and the turbine shroud assembly is coupled using an attachment bolt that extends radially through aligning holes in the carrier segment, U-shaped sheet metal seal, and box-section attachment feature of the blade track segment.
Figure 4:
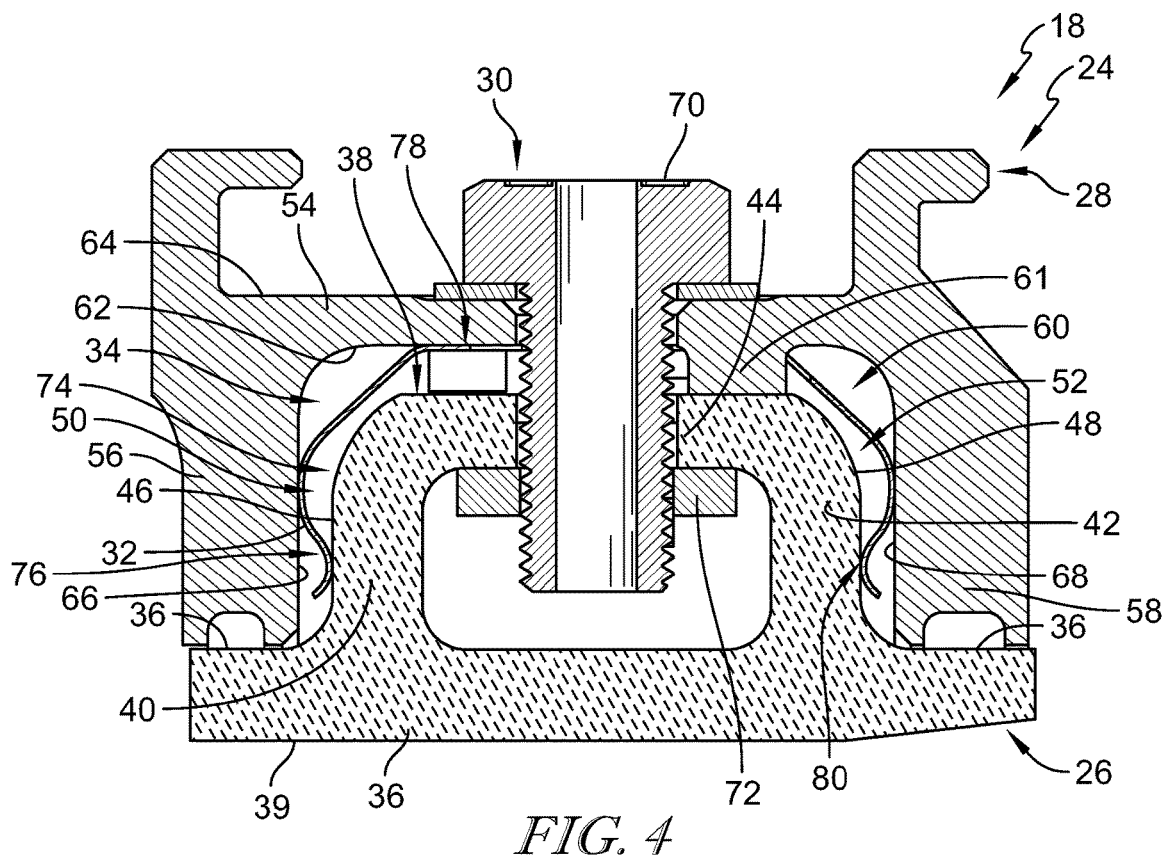
FIG. 4 is a detailed view of a portion of FIG. 2 showing the turbine shroud includes the carrier segment, the blade track segment, the sheet metal seal and the attachment bolt, and the sheet metal seal is located between the carrier segment and the blade track segment and configured to engage with and bias against a forward wall of the blade track segment attachment feature, a forward wall of the carrier segment, an inner wall of the carrier segment, an aft wall of the carrier segment, and an aft wall of the blade track segment attachment feature.

The turbine shroud assembly 24 includes a blade track segment 26, a carrier segment 28, a sheet-metal seal 32, and a mounting system 30 configured to couple the blade track segment 26, the carrier segment 28 and the sheet-metal seal 32 together as shown in FIG. 3. The carrier segment 28 is located outward of the blade track segment 26 and forms a cavity 34 therebetween as shown in FIG. 4. The sheet-metal seal 32 assembles into the cavity 34, radially inward of the carrier segment 28 and radially outward of the blade track segment 26. The mounting system 30 is designed to locate the blade track segments 26 in engine space relative to the carrier segment 28, and locate the sheet-metal seal 32 between the carrier segment 28 and the blade track segment 26.

The carrier segments 28 are metallic support components configured to interface with other metallic components spaced apart from the gas path. In the illustrative embodiment, the carrier segments 28 are segmented circumferentially around the axis 11 as shown in FIG. 3. The blade track segments 26 are ceramic matrix composite components configured to directly face the high temperatures of the gas path 15.

Each blade track segment 26 extends circumferentially partway around the engine axis 11 and forms the outer surface of the gas path 15 as shown in FIGS. 2 and 3. The blade track segment 26 includes a shroud wall 36 and an attachment feature 38 as shown in FIGS. 3 and 4. The shroud wall 36 is arcuate and extends circumferential partway around the engine axis 11 and extends a limited axial distance across the engine axis 11. The shroud wall 36 includes an inner surface 37 that faces the gas path 15, and an outer surface 39 that faces outwardly towards the carrier segment 28. The inner surface 37 cooperates with the turbine wheel assembly 22 to block hot gases in the gas path 15 from passing over the top of the turbine wheel assembly 22. The attachment feature 38 extends radially outward from the outer surface 39 of the shroud wall 36 to provide structure for coupling the blade track segment 26 to the carrier segment 28.

The attachment feature 38 includes a forward post 40, an aft post 42, and an attachment panel 44 to form a hollow box-structure as shown in FIG. 4. The forward post 40 is spaced axially apart from the aft post 42 and the attachment panel 44 bridges between the outer terminating end of the forward post 40 and the outer terminating end of the aft post 42 to create the box-section. The box-section attachment feature 38 extends circumferentially across the shroud wall 36 of the blade track segment 26. The forward post 40 has a forward surface 46 that faces a forward portion 50 of the cavity 34. The aft post has an aft surface 48 that faces an aft portion 52 of the cavity 34.

The carrier segment 28 includes an outer wall 54, a first flange 56 that extends radially inward from the outer wall 54, and a second flange 58 that extends radially inward from the outer wall 54 as shown in FIG. 4. The outer wall 54 includes an inner radial surface 62 and an outer radial surface 64. The first flange 56 is spaced axially apart from the second flange 58. The first flange 56 is located forward of the second flange 58 so that the first flange 56, the outer wall 54, and the second flange 58 form an inward opening cavity 60 therebetween. The attachment feature 38 of the blade track segment 26 is located within the inward opening cavity 60 when the turbine shroud assembly 24 is assembled. Locating pads 61 extends from the outer wall 54 and is located aft of the first flange 56 and forward of the second flange 58.

The first flange 56 has an aft surface 66 that faces the forward portion 50 of the cavity 34 as shown in FIG. 4. The second flange 58 has a forward surface 68 that faces the aft portion 52 of the cavity 34 as shown in FIG. 4. When the blade track segment 26 is assembled to the carrier, the aft surface 66 of the first flange 56 is adjacent across the cavity 34 to the forward surface 46 of the forward post 40. The forward surface 68 of the second flange 58 is adjacent across the cavity 34 to the aft surface 48 of the aft post 42.

The mounting system 30 includes a bolt 70 and threaded attachment feature 72 as shown in FIGS. 3 and 4. The bolt extends radially inward through the outer wall 54 of the carrier segment 28, the sheet-metal seal 32, and the attachment panel 44 of the blade track segment 26. The threaded attachment feature 72 is located in the hollow box-structure of the attachment feature 38 and couples to the inserted bolt 70 to couple the blade track segment 26 and sheet-metal seal 32 to the carrier segment 28. The locating pads 61 engages with the attachment panel 44 to radially locate the blade track segment 26 relative to the carrier segment 28. The attachment feature 72 extends circumferentially partway about the axis 11. The attachment feature 72 is a bias member that distributes loading along the attachment panel 44 of the blade track segment 26.

The sheet-metal seal 32 is solid and extends circumferentially partway around the axis the same circumferential length as the carrier segments 28 and/or blade track segments 26 as shown in FIG. 3. As such, a circumferential length of the seal 32 is about equal to a circumferential length of at least one of the carrier 28 and blade track segment 26.

In the illustrative embodiment, the sheet-metal seal 32 engages the carrier segment 28 and blade track segment 26 as shown in FIG. 4. The sheet-metal seal 32 is formed to have continuous surfaces. The sheet-metal seal 32 forms a U-shape cross-section with radially inward opening channel 74, wherein the attachment feature 38 of the blade track segment 26 locates. The sheet-metal seal 32 is flexible and can be compressed and elastically deformed so that it is biased by the attachment feature 38 and inward opening cavity 60 of the carrier segment 28 to engage with the various surfaces around the perimeter of the cavity 34.

The U-shape of the sheet-metal seal 32 commences with a first portion 76 of the sheet-metal seal 32 to engage the forward surface 46 of the forward post 40 in the forward portion 50 of the cavity 34 as shown in FIG. 4. As the first portion 76 of the sheet-metal seal 32 extends radially outward, the sheet-metal seal 32 engages with the aft surface 66 of the first flange 56. The first portion 76 of the sheet-metal seal 32 transitions into a second portion 78 and extends axially aft and radially outward to engage the inner radial surface 62 of the carrier segment 28.

The second portion 78 of the sheet-metal seal extends axially aft maintaining engagement with the inner radial surface 62 except at a mounting system hole 82 and locating pad holes 84. The mounting system hole 82 is located at the insertion location of the bolt 70 of the mounting system 30 through the sheet-metal seal 32. The locating pad holes 84 are located at the engagement point between the attachment panel 44 with the locating pads 61 of the carrier segment 28. The second portion 78 transitions in a third portion 80 where the sheet-metal seal 32 extends axially aft and radially inward to engage the forward surface 68 of the second flange 58 in the aft portion 52 of the cavity 34. The third portion 80 of the sheet-metal seal 32 further extends radially inward and engages the aft surface 48 of the aft post 42 and then terminates the U-shape thereafter.

In other embodiments, the sheet-metal seal 32 may be a full hoop with no terminating circumferential ends. The sheet-metal seal 32 can be sized circumferentially to have a gap between circumferential terminating ends of the sheet-metal seal 32. In another embodiment, the sheet-metal seal 32 extends circumferentially around the axis 11 more than 360 degrees so that the terminating ends of the sheet-metal seal 32 overlap and form remove a leakage gap from the turbine shroud assembly 24. In some embodiments, a second sheet-metal seal 32 is nested in the first sheet-metal seal 32. The sheet-metal seal 32 may be formed to include slots that extend radially outward into the sheet-metal seal 32. The sheet-metal seal 32 may include corrugations.

Figure 5:
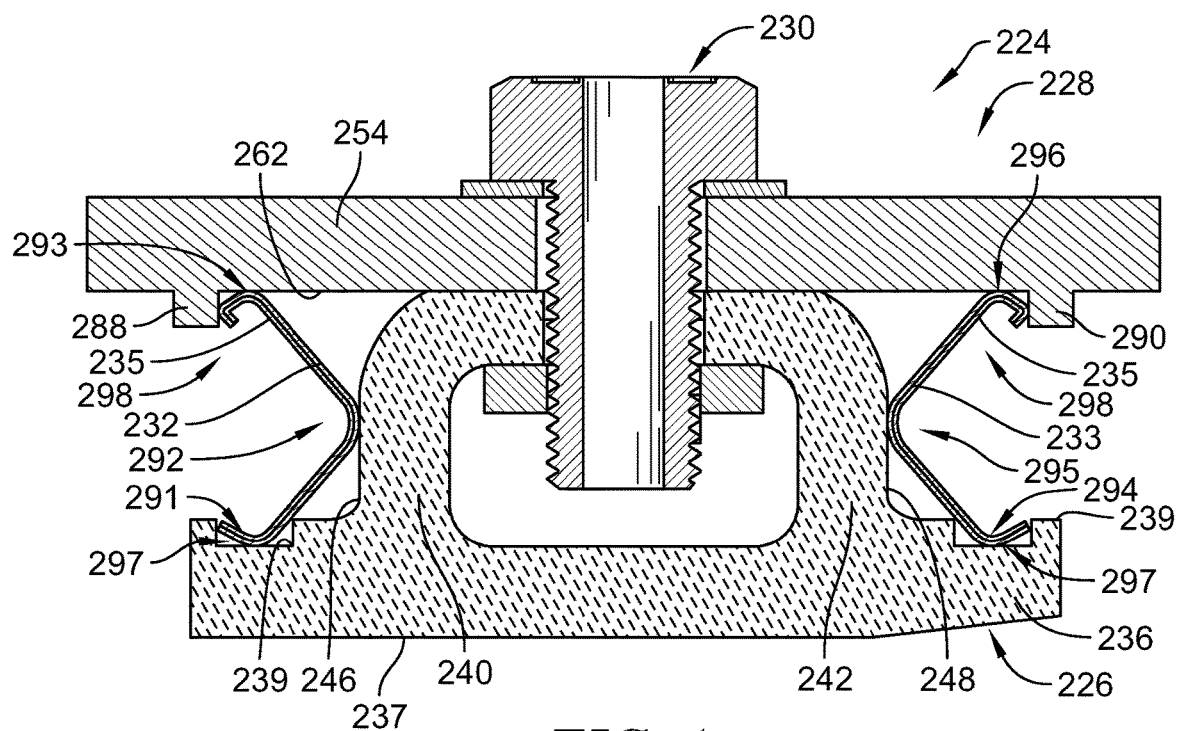
FIG. 5 is detailed view of another turbine shroud showing the blade track segment of FIG. 4 coupled to a carrier segment that includes an outer wall and forward and aft engagement features that extend radially inward from the outer wall toward the blade track, and showing forward and aft sheet metal seals configured to seal the forward and aft ends of the turbine shroud, wherein each seal engages with and is biased against the forward or aft end of a shroud wall of the blade track segment, the corresponding blade track attachment feature wall, and the corresponding engagement feature of the carrier segment.

Another embodiment of a turbine shroud assembly 224 in accordance with the present disclosure is shown in FIG. 5. The turbine shroud assembly 224 is substantially similar to the turbine shroud assembly 24 shown in FIGS. 1-4 and described herein. Accordingly, similar reference numbers in the 200 series indicate features that are common between the turbine shroud assembly 224 and the turbine shroud assembly 24. The description of the turbine shroud assembly 24 is incorporated by reference to apply to the turbine shroud assembly 224, except in instances when it conflicts with the specific description and the drawings of the turbine shroud assembly 224.

The turbine shroud assembly 224 includes a blade track segment 226, a carrier segment 228, a forward seal 232, an aft seal 233, and a mounting system 230 as shown in FIG. 5. The carrier segment 228 includes an outer wall 254, a forward lip 288, and an aft lip 290. In some embodiments, the carrier segment 228 extend around the axis 360 degrees to form a hoop. The outer wall 254 includes an inner radial surface 262 that faces toward the blade track segment 226. The forward lip 288 is located forward of the mounting system 230 and extends radially inward from the inner radial surface 262 to provide an axially facing surface to prevent axial forward movement of the forward seal 232. The aft lip 290 is located aft of the mounting system 230 and extends radially inward from the inner radial surface 262 to prevent axially aft movement of the aft seal 233. In some embodiments the lip features 288, 290 may instead be grooves that extend into the outer wall 254 to provide axially facing surfaces to prevent axial movement of the seals 232, 233. Lip or groove features may also be included in the blade track segment 226 at the location where the seals 232, 233 engage, to prevent axial movement of the seals 232, 233.

The forward seal 232 extends circumferentially partway around the axis 11 the same circumferential length as the carrier segment 228 and/or the blade track segment 226. The forward seal 232 engages the blade track segment 226 and carrier segment 228 that blocks gases from the gas path 15 from flowing therebetween, as shown in FIG. 5. The forward seal 232 is solid and forms continuous surfaces. In other embodiments, the forward seal extends circumferentially 360 degrees around the axis 11 to form a hoop. The forward seal 232 is flexible and forms a reverse C-shape cross section.

The forward seal 232 includes a first terminating end 291, a mid-portion 292, and a second terminating end 293. The first terminating end 291 engages the outer surface 239 of the blade track segment 226. The forward seal 232 extends radially outward and axially aft from the first terminating end 291 to transition to the mid-portion 292. The mid-portion 292 engages with the forward surface 246 of the forward post 240 of the blade track segment 226. The forward seal 232 extends radially outward and axially forward from the mid-portion 292 to transition to the second terminating end 293. The second terminating end 293 engages with the inner radial surface 262 and the forward lip 288 of the carrier segment 228. In other embodiments, the second terminating end 293 may be fixed with the carrier segment 228 and/or the forward lip 288 may be omitted.

The aft seal 233 extends circumferentially partway around the axis 11 the same circumferential length as the carrier segment 228 and/or the blade track segment 226. The aft seal 233 engages the blade track segment 226 and carrier segment 228 that blocks gases from the gas path 15 from flowing therebetween, as shown in FIG. 5. The aft seal 233 is solid and forms continuous surfaces. In other embodiments, the aft seal 233 extends circumferentially 360 degrees around the axis 11 to form a hoop. The aft seal 233 is flexible and forms a C-shape cross section.

The aft seal 233 includes a first terminating end 294, a mid-portion 295, and a second terminating end 296. The first terminating end 294 engages the outer surface 239 of the blade track segment 226. The aft seal 233 extends radially outward and axially forward from the first terminating end 294 to transition to the mid-portion 295. The mid-portion 295 engages with the aft surface 248 of the aft post 242 of the blade track segment 226. The aft seal 233 extends radially outward and axially aft from the mid-portion 295 to transition to the second terminating end 296. The second terminating end 296 engages with the inner radial surface 262 and the aft lip 290 of the carrier segment 228. In other embodiments, the second terminating end 296 may be fixed with the carrier segment 228 and/or the aft lip 290 may be omitted.

Figure 7:
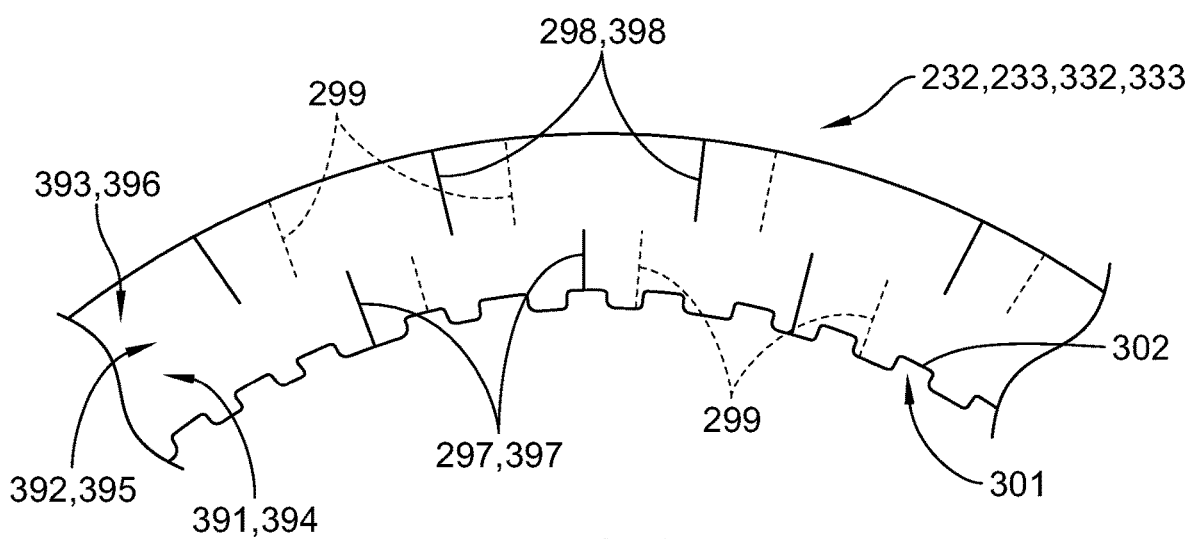
FIG. 7 is a forward elevation view of a portion of the seal of FIG. 5 showing that the seal includes slot features on an outer and an inner diameter of the seal to allow for circumferential expansion of the seal under engine running conditions, the seal also includes corrugated features at the inner diameter of the seal to form a controlled gap that can regulate airflow from one cavity to another through the seal, and further suggests a second seal nested behind the first seal, and the second seal includes similar slot features of first seal shown with dotted lines, and the slots of the first seal and second seal are misaligned circumferentially to avoid creating air leakage gaps.

The forward seal 232 and the aft seal 233 may also include a plurality of inner slots 297 and/or a plurality of outer slots 298 as shown in FIG. 7. The plurality of inner slots 297 are circumferentially spaced equally apart around the seal 232, 233. The plurality of inner slots 297 extend radially outward from the first terminating end 291, 294 through the seal 232, 233 to approximately the mid-portion 292, 295. In some embodiments, the plurality of inner slots 297 may extend radially inward of the mid-portion 292, 295, and in other embodiments the plurality of inner slots 297 may extend radially outward of the mid-portion 292, 295.

The plurality of outer slots 298 are circumferentially spaced equally apart around the seal 232, 233. The plurality of outer slots 298 extend radially inward from the second terminating end 293, 296 through the seal 232, 233 to approximately the mid-portion 292, 295. In some embodiments the plurality of outer slots 298 may extend radially inward of the mid-portion 292, 295, and in other embodiments the plurality of outer slots 298 may extend radially outward of the mid-portion 292, 295. The plurality of inner slots 297 and plurality of outer slots 298 are circumferentially spaced apart so that they do not meet at the mid-portion 292, 295 of the seals 232, 233. The plurality of slots 297, 298 allow for thermal expansion of the seals 232, 233, and/or to allow a predetermined amount of leakage air to pass through the seals 232, 233.

In a further embodiment, a set of overlapping seals 235 overlap the forward seal 232 and the aft seal 233 as shown in FIGS. 5 and 7. The overlapping seals 235 have a similar shape to the reverse C-shape of the forward seal 232 and the C-shape of the aft seal 233 and extend circumferentially around the axis to form a hoop or can include a plurality of seals 235 that extend partway around the axis. The overlapping seals 235 also include a plurality of slots 299 that are similar to the plurality of inner slots 297 and the plurality of outer slots 298 of the seal 232, 233. The overlapping seals 235 are positioned circumferentially so that the plurality of slots 299 do not align with the plurality of inner slots 297 and the plurality of outer slots 298 of the seal 232, 233. The circumferential misalignment of the plurality of slots 297, 298, 299 allows for better sealing to block gases from the gas path 15 from flowing between the blade track segment 226 and the carrier segment 228 as suggested in FIG. 7.

Figure 6:
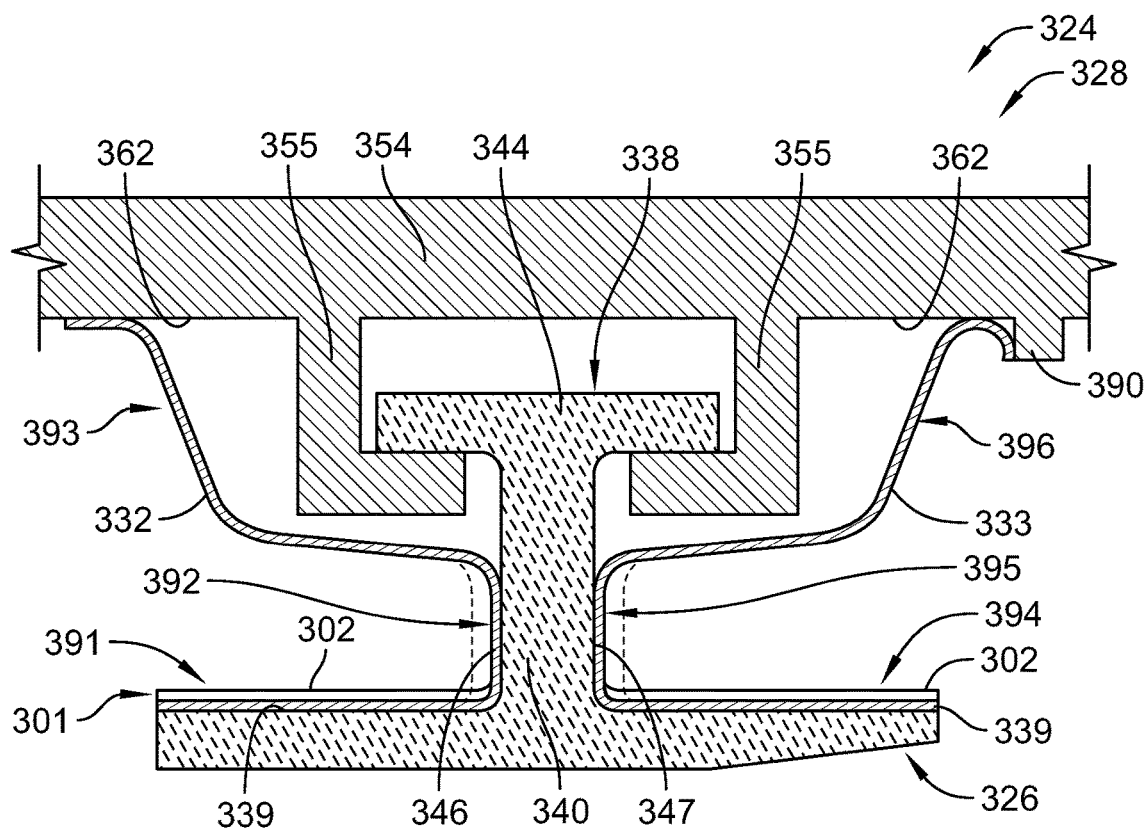
FIG. 6 is detailed view of another turbine shroud including a carrier segment with integrated hangers, a blade track segment with a T-shaped attachment feature that engages with the carrier hangers, and a forward seal and an aft seal, and the forward and aft seals are attached to an outer wall of the carrier and extends along a perimeter of a the turbine shroud assembly, along the hanger surfaces, engaging with a mount post of the blade track segment and then extending along a blade track segment shroud wall.

Another embodiment of a turbine shroud assembly 324 in accordance with the present disclosure is shown in FIG. 6. The turbine shroud assembly 324 is substantially similar to the turbine shroud assembly 24 shown in FIGS. 1-4 and described herein. Accordingly, similar reference numbers in the 300 series indicate features that are common between the turbine shroud assembly 324 and the turbine shroud assembly 24. The description of the turbine shroud assembly 24 is incorporated by reference to apply to the turbine shroud assembly 324, except in instances when it conflicts with the specific description and the drawings of the turbine shroud assembly 324.

The turbine shroud assembly 324 includes a blade track segment 326, a carrier segment 328, a forward seal 332, and an aft seal 333 as shown in FIG. 6. The carrier segment 328 includes an outer wall 354, forward and aft hangers 355, and an aft lip 390. The forward and aft hangers 355 extend radially inward from the outer wall 354 and engage with an attachment feature 338 of the blade track segment 326. The aft lip 390 is located aft of the hangers 355 and extends radially inward from the inner radial surface 362 of the outer wall 354 to prevent axial aft movement of the aft seal 333. The attachment feature 338 of the blade track segment 326 includes a mount post 340 and an attachment panel 344.

The mount post 340 extends radially outward from the outer surface 339 of the blade track segment 326 and has forward surface 346 and aft surface 347. The attachment panel 344 extends axially forward and aft of the outer portion of the mount post 340 so that the attachment feature 338 has a T-shape. The attachment panel 344 engages with the hangers 355 of the carrier segment 328 to couple the carrier segment 328 to the blade track segment 326.

The forward seal 332 extends circumferentially partway around the axis 11 the same circumferential length as the carrier segment 328 and/or blade track segment 326. The forward seal 332 engages blade track segment 326 and carrier segment 328 to blocks gases from the gas path 15 from flowing therebetween, as shown in FIG. 6. The forward seal 232 is solid and forms continuous surfaces. In other embodiments, the forward seal 332 extends circumferentially 360 degrees around the axis 11 to form a hoop.

The forward seal 332 is flexible and includes a first terminating end 391, a mid-portion 392, and a second terminating end 393. The first terminating end 391 engages the forward end of the outer surface 339 of the blade track segment 326 and maintains engagement as it extends aft along the outer surface 339 towards the mount post 340. The forward seal 332 transitions to the mid-portion 392 at the base of the mount post 340. The mid-portion 392 extends radially outward maintaining engagement with the forward surface 346 of the mount post 340 to approximately the radial mid-height of the mount post 340. The forward seal 332 extends radially outward and axially forward from the mid-portion 392 to transition to the second terminating end 393 avoiding contact with the hangers 355 in the illustrative embodiment.

In the illustrative embodiment, the second terminating end 393 of the forward seal 332 attaches to the inner radial surface 362 at the forward end of the outer wall 354. The forward seal 332 can be brazed, welded, adhered or other method to attach to the inner radial surface 362 of the carrier segment 328. In another embodiment, the outer wall can include a forward lip that engages the forward seal 332 and block forward movement of the second terminating end 393.

The aft seal 333 extends circumferentially partway around the axis 11 the same circumferential length as the carrier segment 328 and/or blade track segment 326. The aft seal 333 engages blade track segment 326 and carrier segment 328 to blocks gases from the gas path 15 from flowing therebetween, as shown in FIG. 6. The aft seal is solid and forms continuous surfaces. In other embodiments, the aft seal 333 extends circumferentially around the axis 11 to form a hoop.

The aft seal 333 flexible and includes a first terminating end 394, a mid-portion 395, and a second terminating end 396. The first terminating end 394 engages the aft end of the outer surface 339 of the blade track segment 326 and maintains engagement as it extends forward along the outer surface 339 towards the mount post 340. The aft seal 333 transitions to the mid-portion 395 at the base of the mount post 340. The mid-portion 395 extends radially outward maintaining engagement with the aft surface 347 of the mount post 340 to approximately the radial mid-height of the mount post 340. The aft seal 333 extends radially outward and axially aft from the mid-portion 395 to transition to the second terminating end 396 avoiding contact with the hangers 355 in the illustrative embodiment.

In the illustrative embodiment, the second terminating end 396 of the aft seal 333 engages with the inner radial surface 362 and the aft lip 390. In another embodiment, the second terminating end 396 of the aft seal 333 can be attached to the inner radial surface 362 by brazing, welding, adhering or other attachment method.

In the illustrative embodiment the forward and aft seals 332, 333 include corrugations 301 between the first terminating ends 391, 394 and the mid-portions 392, 395 as shown in FIG. 6. The corrugations extend along the portion of the seals 332, 333 that engage with the outer surface 339 of the blade track segment 326. The corrugations include a plurality of raised portions 302 that are equally space circumferentially around the seals 332, 333 as shown in FIG. 7. In other embodiments, any desired spacing may be used for a desired cooling effect. In some embodiments, the corrugations may further extend along the mid-portions 392, 395 that engage with the forward and aft surfaces 346, 347 of the mount post 340.

The corrugations 301 may form channels that allow a controlled flow of gases to flow between the blade track segment 326 and the seal 332, 333. The amount of gases allowed to flow between the blade track segment 326 and the seal 332, 333 can be controlled by adjusting the radial height and circumferential width of the plurality of raised portions 302. In another embodiment, the corrugations can be included in only the forward seal 332, only the aft seal 333, or in both seals 332, 333. In some embodiments, the corrugations 301 are only included along surface 339 and may act as heat shields to reduce conductive heat transfer from the blade track segment 326 across the seals 332, 333.

In a further embodiment the forward seal 332 and the aft seal 333 may also include a plurality of inner slots 397 and a plurality of outer slots 398 as shown in FIG. 7. The plurality of inner slots 397 are circumferentially spaced equally apart around the seal 332, 333. The plurality of inner slots 397 extend radially outward from the first terminating end 391, 394 through the seal 332, 333 and through a determined length of the mid-portion 392, 395. The plurality of outer slots 398 are circumferentially spaced equally apart around the seal 232, 233. The plurality of outer slots 398 extend radially inward from the second terminating end 393, 396 through the seal 332, 333 to a determined length along the mid-portion 392, 395. The plurality of inner slots 397 and plurality of outer slots 398 are circumferentially spaced apart so that they do not meet at the mid-portion 392, 395 of the seals 332, 333. The plurality of slots 397, 398 allow for thermal expansion of the seals 332, 333, and/or to allow a predetermined amount of leakage air to pass through the seals 332, 333.

Due to the low strength capability, low coefficient of thermal expansion, and geometric limitations of parts made from ceramic matrix composites, secondary airflow solutions may be conceived to seal turbine shroud assemblies. The sealing solutions described herein may serve in some representative turbine shroud assemblies, but need not be limited to only the blade track segment 26 and carrier segment 28 documented in the explanatory figures. The embodiments described herein use sheet-metal seals that may be elastically deformed upon assembly of the turbine shroud assembly 24, forming a seal against some of the surfaces.

Two sheet metal sections may be captured when the box-section attachment feature 238 of the blade track segment 226 is installed into the carrier segment 228 with mounting system 230 as shown in FIG. 5. Installation of the segment may elastically deform the sheet-metal seals 232, 233 between the carrier segment 228 and the blade track segment 226, forming a sealing interface between the sheet-metal seals 232, 233 and the carrier segment 228. Another sealing interface may be formed between the blade track segment 226 and sheet-metal seals 232, 233. These two seals 232, 233 disposed forward and aft of the blade track segment 226 may isolate the cavity containing the attachment features 238 of the blade track segment 226, which may allow a pressure ratio to be selected that may be advantageous to the performance of the design.

A further embodiment may use sheet-metal seals 332, 333 as ducting to direct flow in a controlled manner, rather than or in addition to a seal meant to block flow as shown in FIG. 6. The sheet-metal seals 332, 333 may include corrugations 301, wherein only a portion of the sheet-metal seals 332, 333 are in contact with or in close proximity to the blade track segment 326.

The sealing arrangement depicted in FIG. 4 uses a sheet-metal seal 32 formed to provide a seal between the aft surface 66 of the first flange 56, the forward surface 68 of the second flange 58, and the forward and aft surfaces 46, 48 of the attachment feature 38 of the blade track segment 26. This sealing arrangement may allow the sheet-metal seal 32 to provide a seal fore and aft of the attachment feature 38 with a single piece, simplifying the turbine shroud assembly 24. Access holes 82, 84 may be cut in the sheet-metal seal 32 to allow passage of the bolt 70 of the mounting system 30 or locating pads 61 extending inward from the carrier segment 28 to meet datum surfaces on the blade track segment 26.

FIG. 3 shows the sheet-metal seal 32, the carrier segment 28, and the assembly path of the bolt 70 through the mounting system hole 82 in the sheet-metal seal 32. The mounting system 30 and locating pads 61 may provide function as anti-rotation features for the sheet-metal seal 32.

A method of introducing cooling air into the turbine shroud assembly 24 may be to make the locating pad 61 features intermittent. The locations of the sheet-metal seal 32 where metal is removed may be sized to either act as a controlling orifice or to be non-restricting. Air would flow through the intermittent locating pad hole 84 to the cavity 34 to cool the blade track segment 26.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising
a carrier made of metallic materials and arranged circumferentially around an axis, the carrier having an inner radial surface that faces the axis and an outer radial surface opposite the inner radial surface,
a blade track segment made of ceramic matrix composite materials, the blade track segment supported by the carrier to locate the blade track segment radially outward of the axis and define a portion of a gas path of the turbine shroud assembly, and the blade track segment including a shroud wall that extends circumferentially partway around the axis and an attachment feature that extends radially outward from the shroud wall and is coupled with the carrier, the attachment feature including a first radially extending portion, a second radially extending portion axially spaced apart from the first radially extending portion, and an axially extending portion that extends between and interconnects radially outermost ends of the first radially extending portion and the second radially extending portion, and
a first seal made of sheet metal and arranged circumferentially at least partway around the axis, the first seal engaged with the inner radial surface of the carrier and with at least one axially facing surface of the blade track segment to block gases from flowing between the carrier and the blade track segment, and wherein the first seal is compressed and elastically deformed by the carrier and the blade track segment to bias the first seal into engagement with the blade track segment.

2. The turbine shroud assembly of claim 1, wherein a portion of the first seal is biased into engagement with the attachment feature of the blade track segment.

3. The turbine shroud assembly of claim 2, wherein the first seal is formed to define a radially inwardly opening channel, the attachment feature of the blade track segment is located in the radially inwardly opening channel, and portions of the first seal are biased into engagement with an axially facing fore surface and an axially facing aft surface of the at least one axially facing surface of the attachment feature.

4. The turbine shroud assembly of claim 3, wherein the carrier includes an outer wall, a first flange that extends radially inward from the outer wall, and a second flange that extends radially inward from the outer wall the same radial distance as the first flange so that the outer wall, the first flange, and the second flange define a radially inwardly opening cavity that receives the attachment feature and the first seal, and portions of the first seal are biased into engagement with the first flange and the second flange.

5. The turbine shroud assembly of claim 2, wherein the first seal includes a first terminal end engaged with the carrier, a second terminal end engaged with the shroud wall, and a mid-portion located between the first and second terminal ends and engaged with the attachment feature.

6. The turbine shroud assembly of claim 5, wherein at least one of the carrier and the blade track segment includes a radially facing surface and an axially facing surface and at least one of the first terminal end and the second terminal end is engaged with the axially facing surface to block axial movement of the first seal relative to the carrier and/or blade track segment.

7. The turbine shroud assembly of claim 1, wherein a portion of the first seal is formed to define axially extending corrugations to allow gases to flow between the blade track segment and the first seal through the corrugations.

8. The turbine shroud assembly of claim 1, further comprising a second seal made of sheet metal and arranged about the axis circumferentially, the second seal having a shape substantially similar to a shape of the first seal, and the second seal nested with the first seal.

9. The turbine shroud assembly of claim 8, wherein the first seal is formed to define a first plurality of slots that extend radially partway through the first seal, the second seal is formed to define a second plurality of slots that extend radially partway through the second seal, and the second plurality of slots are misaligned circumferentially with the first plurality of slots.

10. A turbine shroud assembly for use with a gas turbine engine, the turbine shroud assembly comprising
a carrier arranged circumferentially at least partway around an axis,
a blade track segment including a shroud wall that extends circumferentially partway around the axis and an attachment feature that extends radially outward from the shroud wall and coupled with the carrier such that the blade track segment is supported radially by the carrier, the attachment feature including a first radially extending portion and an axially extending portion attached to a radially outermost end of the first radially extending portion and extending axially beyond an axially facing fore surface of the first radially extending portion and an axially facing aft surface of the first radially extending portion, and
a seal made of sheet metal and extending circumferentially about the axis and wherein the seal is elastically deformed between the carrier and the blade track segment to urge the seal into engagement with an inner radial surface of the carrier and at least one of the axially facing fore surface and the axially facing aft surface of the attachment feature of the blade track segment,
wherein both a first portion of the axially extending portion that extends axially beyond the axially facing fore surface of the first radially extending portion and a second portion of the axially extending portion that extends axially beyond the axially facing aft surface of the first radially extending portion contact and engage the carrier.

11. The turbine shroud assembly of claim 10, wherein the seal is curved to define a channel.

12. The turbine shroud assembly of claim 10, wherein the seal is fixed to the carrier.

13. The turbine shroud assembly of claim 10, wherein the seal is formed to define axially extending corrugations to allow gases to flow between the blade track segment and the seal through the corrugations.

14. The turbine shroud assembly of claim 10, wherein the seal is engaged with the attachment feature.

15. The turbine shroud assembly of claim 10, further comprising a second seal made of sheet metal and nested with the first seal.

16. The turbine shroud assembly of claim 15, wherein the seal is formed to define a first plurality of slots that extend radially partway through the seal, the second seal is formed to define a second plurality of slots that extend radially partway through the second seal, and the second plurality of slots are misaligned circumferentially with the first plurality of slots.

17. The turbine shroud assembly of claim 10, wherein the carrier includes a radially facing surface and an axially facing surface and at least one of a first terminal end of the first seal and a second terminal end of the first seal is engaged with the axially facing surface of the carrier or at least one of the axially facing fore surface and the axially facing aft surface of the attachment feature to block axial movement of the first seal relative to the carrier and/or blade track segment.

18. The turbine shroud assembly of claim 10, further comprising a fastener that extends through the carrier and into the attachment feature to couple the attachment feature with the carrier.

19. The turbine shroud assembly of claim 10, wherein the seal extends circumferentially partway around the axis by a circumferential length that is the same as a circumferential length as one of the carrier and the blade track segment.

* * * * *